UNITED STATES PATENT OFFICE.

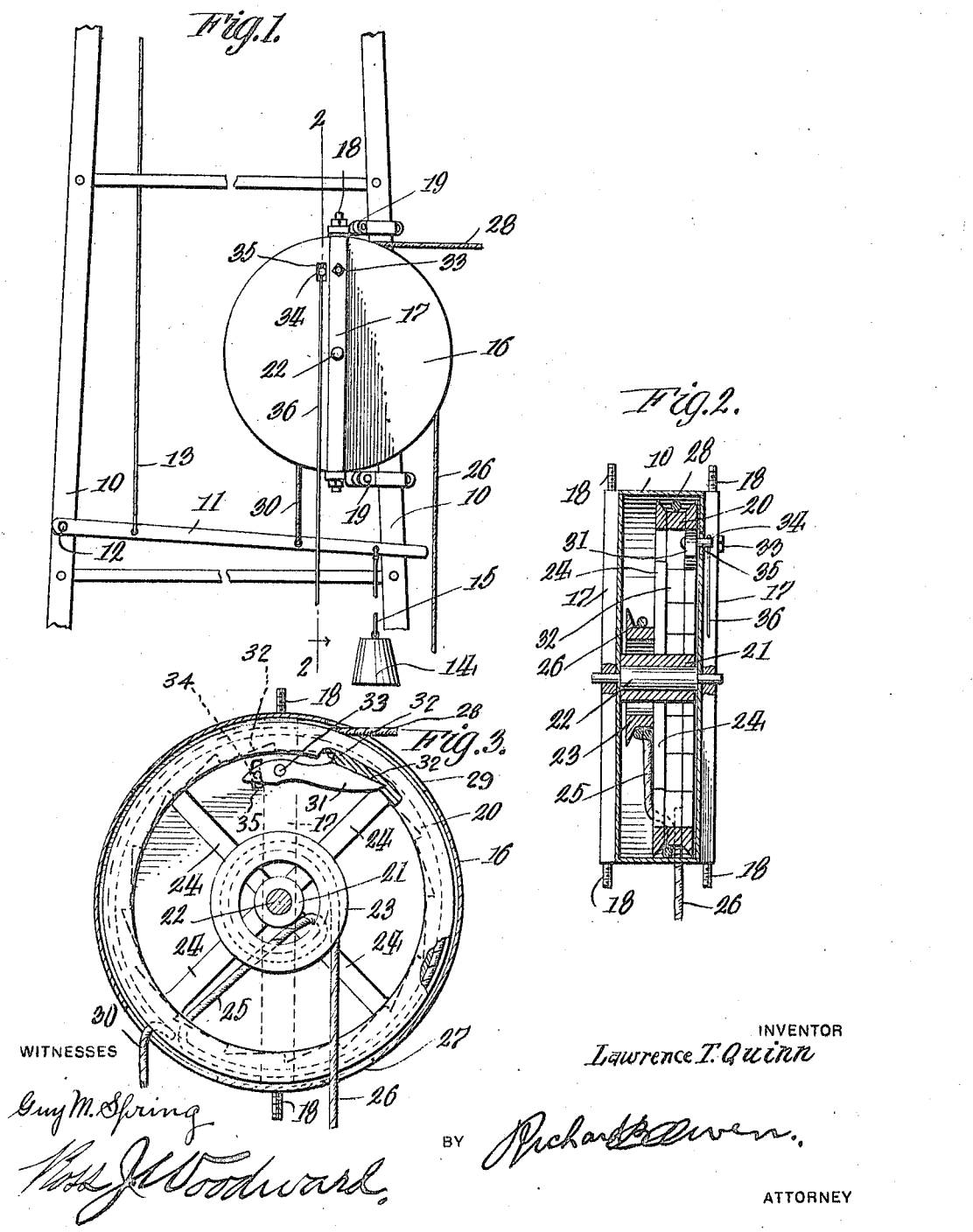

LAWRENCE T. QUINN, OF SIOUX FALLS, SOUTH DAKOTA.

WINDMILL ATTACHMENT.

1,412,750.

Specification of Letters Patent.  Patented Apr. 11, 1922.

Application filed August 17, 1920. Serial No. 404,214.

*To all whom it may concern:*

Be it known that I, LAWRENCE T. QUINN, a citizen of the United States, residing at Sioux Falls, in the county of Minnehaha and State of South Dakota, have invented certain new and useful Improvements in Windmill Attachments, of which the following is a specification.

This invention relates to an improved attachment for a wind-mill and the principal object of the invention is to provide an attachment whereby the mill may be thrown either into or out of gear by a person standing at a distance from the mill or at the base of the mill.

Another object of the invention is to so construct this attachment that it may be connected with the frame of a mill and connected with the actuating lever of the mill by a line connected with a drum rotatably mounted in the housing of the attachment, the actuating line for moving the drum extending through the housing with one of the lines carried to a point distant from the mill.

Another object of the invention is to so connect the actuating line with the drum that one end portion may extend downwardly for easy reach by a person standing at the base of the mill and the second end portion carried substantially horizontally from the housing for use by a person standing at a point remote from the mill.

Another object of the invention is to so construct this attachment that it can be used with a conventional structure of wind-mill thus permitting it to be sold as a separate article from the mill and connected with a mill already in use.

This invention is illustrated in the accompanying drawings wherein:

Figure 1 is a view in elevation showing a fragment of a wind-mill tower with the attachment connected therewith.

Fig. 2 is a vertical sectional view through the attachment taken along the line 2—2 of Fig. 1; and Fig. 3 is a vertical sectional view through the attachment taken at right angles to the view in Fig. 2.

This attachment which may be termed a lever actuating device is to be connected with one of the corner posts 10 of the wind-mill tower at a point above the actuating lever 11 which lever is pivotally mounted as shown at 12 and connected with the line 13. This line is carried upwardly through the tower and connected with the usual mill gear and under normal circumstances will be drawn upon through the action of the weight 14 connected with the free end portion of the lever 11 by line 15. It will be seen under normal circumstances, the lever 11 will be held in a lowered position and can only be raised by a direct pulling action.

The housing 16 for this lever actuating element or device is provided with side bars 17 terminating at their upper and lower ends in threaded stems 18 with which will be connected clamps 19 connecting the housing with one of the corner posts of the mill tower. A drum 20 is positioned within the housing and is provided with a hub 21 fitting upon the axle 22, the ends of which are passed through registering openings formed in the bars 17 and the walls of the housing. An auxiliary drum 23 is carried by the spokes 24 of the main drum 20 and is positioned in spaced relation to the hub 21; thus providing space for the rope 25 to pass between the auxiliary drum and the hub as shown in Fig. 3. This rope 25 is passed through an opening formed in the auxiliary drum and has one end portion 26 wrapped about the auxiliary drum and passed through a slot 27 formed in the housing. The opposite end portion 28 of the rope is carried across to the main drum and after being passed through an opening formed in the drum is wound upon the drum and carried out through the opening 29 formed in the upper portion of the housing. When it is desired to rotate the drum, a pull may be exerted either upon the end portion 26 or the end portion 28 of the line 25 and the drum will be rotated to wind the line 30 thereon, which serves to raise the lever 11 against the action of the weight 14. A pawl 31 is pivotally mounted in the housing to engage the teeth 32 forming an internal ratchet on the drum 20, the pawl being pivotally mounted as shown at 33 and provided with a stem or pin 34 which extends through an opening or slot 35 formed in the housing and is connected with a rod 36 as shown in Figs. 1 and 2.

The operation of this improved wind-mill attachment is as follows: A pull upon the end portion 26 or that 28 of line 25 will rotate the drum 20 to the left, wind the line 30 thereon and thus raise the lever 11. This winding of the drum is continued until pawl 31 is released; then the line which is being pulled is released and allows the drum to rotate in the opposite direction.

When the mill is thrown in from a distance it is held by rope 28 and the pawl is not used. The rod 36 attached to the pawl is raised to set the drum from the base of the mill.

From the foregoing description, taken in connection with the accompanying drawings, the advantages of the construction and the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

What is claimed is:—

1. A device as specified including a rotatable drum, a line connecting said drum with mechanism to be operated, an auxiliary drum carried by said first mentioned drum, a line wrapped around said auxiliary drum and having one end passed through an opening therein and depending to a position convenient to be grasped from below the drums, the other end of said line being carried across to the main drum and wound therearound and extended to a position to be actuated at a point remote from the drums.

2. A device as specified including a rotatable drum, a line connected to said drum and engageable with mechanism to be operated, an auxiliary drum carried by said first mentioned drum, a line wrapped around said auxiliary drum and having one end passed through an opening therein and depending to a position convenient to be grasped from below the drums, the other end of said line being carried across to the main drum and wound therearound and extended to a position to be actuated at a point remote from the drums, said main drum being internally toothed and a pawl mounted to engage said teeth to lock the drum against turning in one direction, and means for releasing the pawl.

In testimony whereof I affix my signature in presence of two witnesses.

LAWRENCE T. QUINN.

Witnesses:
H. C. KEHM,
JOHN M. MURPHY.